Figure 1:
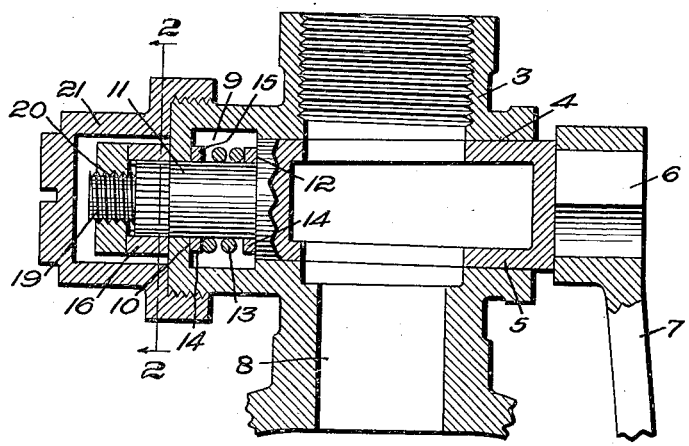

Feb. 2, 1932.  J. E. SWENDEMAN  1,843,251

ROTARY PLUG VALVE

Filed May 9, 1929

Inventor:
Joseph E. Swendeman,
by Emery, Booth, Varney & Townsend
Attys.

Patented Feb. 2, 1932

1,843,251

UNITED STATES PATENT OFFICE

JOSEPH E. SWENDEMAN, OF BOSTON, MASSACHUSETTS

ROTARY PLUG VALVE

Application filed May 9, 1929. Serial No. 361,752.

This invention relates to a valve structure of the class in which a tapered, rotary plug turns in a correspondingly tapered seat in a casing.

The invention will be best understood by reference to the following description, when taken in connection with the accompanying drawings of one specific embodiment thereof, while its scope will be more particularly pointed out in the appended claims.

Figure 2:
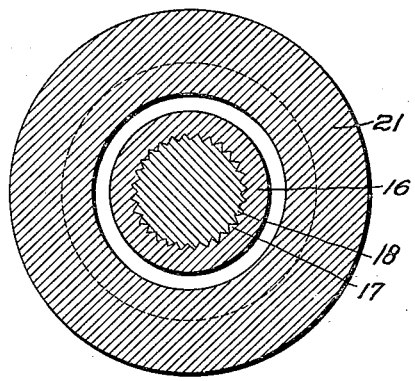

In the drawings:

Fig. 1 is a sectional view of the valve structure in a plane containing the axis of the valve; and Fig. 2 is a sectional view, on an enlarged scale, on line 2—2 of Fig. 1.

Referring to the drawings, and to the embodiment of the invention which is illustrated therein, there is shown a valve structure comprising a casing 3, provided with a tapered bore 4, which receives a correspondingly-tapered plug valve 5, provided with a head 6 having a square, or other suitable formation to receive a handle 7, by means of which the valve may be turned. The valve casing is provided with a usual passage 8, controlled by turning the valve in the casing.

The casing is provided with a spring chamber 9 and a shoulder or abutment 10 at the outer end of the chamber, and the valve is provided with a reduced shank 11, and at the inner end of the shank with an abutment or shoulder 12. A spring 13, interposed between the abutments or shoulders, tends to move the valve out of the bore in the casing,—that is to say, it tends to loosen the valve. Herein, washers 14 and 15 are interposed between the ends of the spring and the abutments 12 and 10, respectively.

A collar 16, having splined connection with the shank 11, rests against the outer end of the valve casing. This splined connection is conveniently made by broaching the collar to provide V-shaped splines 17 (see Fig. 2), and by knurling or otherwise machining the shank to provide correspondingly shaped splines 18 on the shank. The thickness of the collar is such that it extends a substantial distance beyond the outer end of the splined shank (see Fig. 1). The valve has a still further reduced portion 19, threaded to receive a nut 20, which rests against the outer end of the collar 16, and resists the outward thrust of the spring against the valve. Because of the splined connection between the collar and the shank, rotative movement of the valve has no tendency to turn the nut relatively to the shank on which it is threaded. Accordingly, the nut, when adjusted, will serve to maintain the exact desired position of the valve endwise in its casing, while the spring, urging the valve in an outward direction, prevents the valve from sticking in the casing. A hollow cap 21, threaded onto the casing and enclosing the nut 20 and collar 16, prevents the nut from being tampered with and its adjustment destroyed. Thus, it is evident that the described construction obviates certain disadvantages of other tapered plug valves now in general use.

Having thus described one embodiment of the invention, but without limiting myself thereto, what I claim and desire by Letters Patent to secure is:

1. In a valve structure, the combination of a casing provided with a tapered bore, a spring chamber, and a shoulder at the outer end of said chamber; a tapered plug valve received in said bore and presenting at its smaller end a shoulder, a reduced shank and still further reduced threaded portion; a spring within said chamber between said shoulders and tending to move said valve out of said bore; a ring having splined connection with said shank and resting against said casing; a nut threaded onto said threaded portion and resting against said ring and resisting the outward thrust of said spring against said valve; and a cap attached to said casing and enclosing said nut and said ring.

2. In a valve structure, the combination of a casing provided with a tapered bore, a spring chamber, and a shoulder at the outer end of said chamber; a tapered plug valve received in said bore and presenting at its smaller end a shoulder, a reduced shank and still further reduced threaded portion; a spring within said chamber between said shoulders and tending to move said valve out of said bore; a ring having splined connection with said shank and resting against said casing; and a nut threaded onto said threaded portion and resting against said ring and resisting the outward thrust of said spring against said valve.

3. In a valve structure, the combination of a casing provided with a tapered bore; a tapered plug valve received in said bore; a spring adjacent to the smaller end of said valve tending to move said valve axially out of said bore; a screw and nut adjacent to the smaller end of said valve resisting the outward thrust of said spring; and means adjacent to the smaller end of said valve to cause said nut to turn with said valve when the latter is rotated.

4. In a valve structure, the combination of a casing provided with a tapered bore; a tapered plug valve received in said bore; a spring adjacent to the smaller end of said valve tending to move said valve axially out of said bore; a screw and nut adjacent to the smaller end of said valve resisting the outward thrust of said spring; and means interposed between said nut and said casing adjacent to the smaller end of said valve to transmit the thrust of said nut against said casing and to cause said nut to turn with said valve.

5. In a valve structure, the combination of a casing provided with a tapered bore; a tapered plug valve received in said bore; a spring adjacent to the smaller end of said valve tending to move said valve axially out of said bore, a screw and nut adjacent to the smaller end of said valve resisting the outward thrust of said spring; and a collar interposed between said nut and said casing adjacent to the smaller end of said valve to transmit the thrust of said nut against said casing, said collar having non-rotatable, axially movable connection with said valve.

In testimony whereof, I have signed my name to this specification.

JOSEPH E. SWENDEMAN.